(12) United States Patent
Di Modugno

(10) Patent No.: US 8,579,362 B2
(45) Date of Patent: Nov. 12, 2013

(54) CRASH BOX

(75) Inventor: Francesca Di Modugno, Missaglia (IT)

(73) Assignee: Tres SRL, Torino (TO) (IT)

( * ) Notice: Subject to any disclaimer, the term of this patent is extended or adjusted under 35 U.S.C. 154(b) by 0 days.

(21) Appl. No.: 13/254,017

(22) PCT Filed: Mar. 8, 2010

(86) PCT No.: PCT/IB2010/050980
§ 371 (c)(1), (2), (4) Date: Aug. 31, 2011

(87) PCT Pub. No.: WO2010/103449
PCT Pub. Date: Sep. 16, 2010

(65) Prior Publication Data
US 2011/0316307 A1    Dec. 29, 2011

(30) Foreign Application Priority Data

Mar. 12, 2009  (IT) .............. MI2009A0368

(51) Int. Cl.
*B60R 19/18* (2006.01)
(52) U.S. Cl.
USPC .............. 296/187.03; 293/133; 296/187.01
(58) Field of Classification Search
USPC ............ 293/136, 110, 122, 133; 296/187.03, 296/187.01
See application file for complete search history.

(56) References Cited

U.S. PATENT DOCUMENTS

| | | | | |
|---|---|---|---|---|
| 4,029,350 A | * | 6/1977 | Goupy et al. | 293/110 |
| 5,150,935 A | * | 9/1992 | Glance et al. | 293/136 |
| 5,419,416 A | * | 5/1995 | Miyashita et al. | 188/371 |
| 5,746,419 A | * | 5/1998 | McFadden et al. | 267/140 |
| 5,806,889 A | * | 9/1998 | Suzuki et al. | 280/748 |
| 6,247,745 B1 | * | 6/2001 | Carroll et al. | 188/371 |
| 7,093,866 B2 | * | 8/2006 | Toneatti et al. | 293/133 |
| 2007/0182170 A1 | * | 8/2007 | Renault et al. | 293/102 |

FOREIGN PATENT DOCUMENTS

| | | |
|---|---|---|
| DE | 25 09 265 A1 | 9/1975 |
| EP | 1 197 398 A2 | 4/2002 |
| EP | 1197398 A2 * | 4/2002 |
| FR | 2 866 830 A1 | 9/2005 |
| WO | 2004/106117 A1 | 12/2004 |

OTHER PUBLICATIONS

International Search Report, dated Jul. 7, 2010, from corresponding PCT application.

* cited by examiner

*Primary Examiner* — Jason S. Morrow
*Assistant Examiner* — E Turner Hicks
(74) *Attorney, Agent, or Firm* — Young & Thompson

(57) ABSTRACT

A crash box (10) for a motor vehicle, is made of a polymeric material and has a first open frontal extremity (12) and a second rear extremity (14). The crash box (10) includes a structure (20) substantially alveolar defined by a plurality of channels (30) realized in just one piece, each of which extends internally to the crash box starting form the first open frontal extremity (12) towards the second rear extremity (14). The crash box includes stiffening elements (50) of the second rear extremity, which are able to stiffen the plurality of channels (30) only in proximity of the second rear extremity 14. Preferably the stiffening elements (50) are directly integrated with the second rear extremity (14), in particular internally to the same, and are preferably made of a polymeric material having a good impact strength.

19 Claims, 5 Drawing Sheets

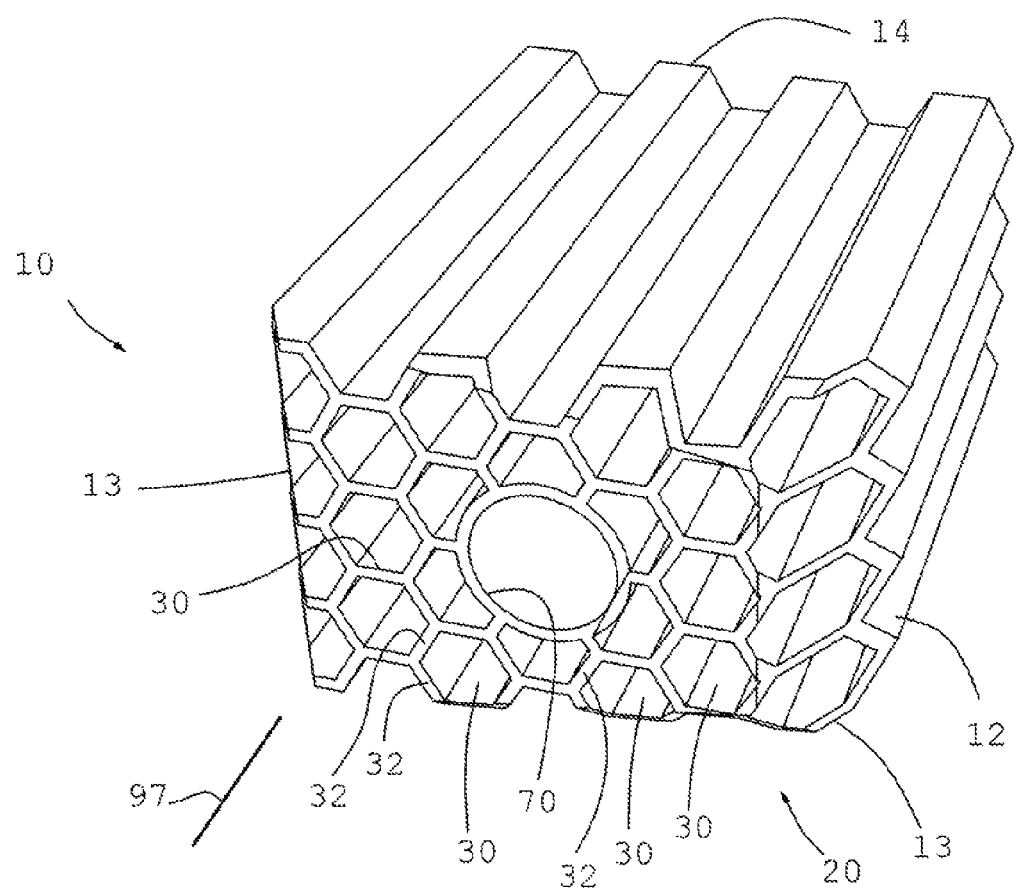
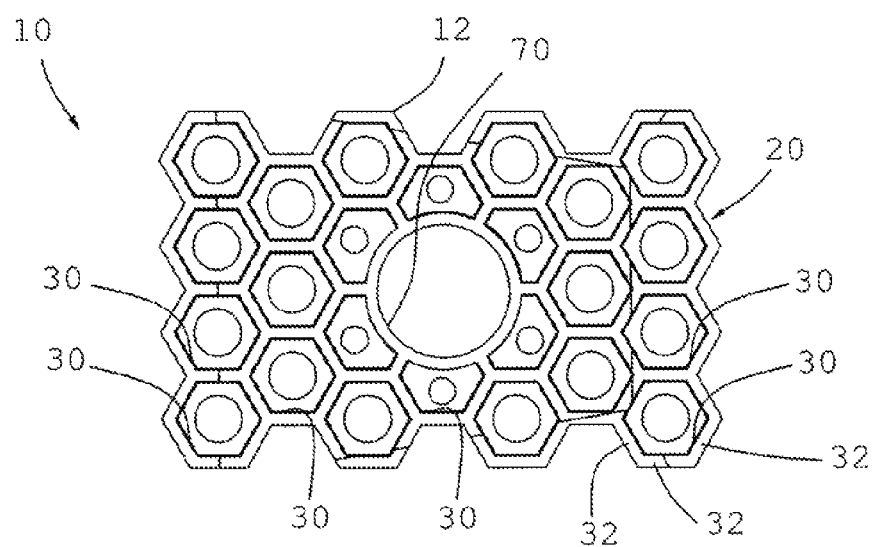

CRASH BOX

BACKGROUND OF THE INVENTION

1. Field of the Invention

The present invention refers to a crash box applicable in the automotive field and in particular usable as sacrificial element in a bumper structure of a motor vehicle.

2. Description of the Related Art

Typically a crash box is able to absorb a portion of kinetic energy during a crash of a motor vehicle against an obstacle fixed or mobile.

In particular the present invention is referred to a crash box of polymeric type, of the type realized in particular through injection molding and having a substantially alveolar structure, in such a way to have a good impact strength and high rigidity, accompanied with a reduced weight.

Each crash box shows a first frontal extremity which stand for first the crash, and a second rear extremity, which is constrained to a frame of the vehicle.

Each crash box is in fact designed for having in the case of crash a permanent plastic deformation and a programmed collapse starting from a frontal portion towards a second rear portion of the same determining consequently a plurality of folding starting from said frontal portion towards said second rear portion.

In this way each crash box is able to absorb and to progressively dissipate a portion of kinetic energy through plastic deformation and by means of the propagation of said plurality of folding, maintaining a reduced volume and weight.

A disadvantage of the polymeric crash boxes is that, in the case of a crash force angled respect to the first frontal extremity, it determines a bending moment which compromise the stability and, often determines a sudden failure or a deformation of the rear extremity of the crash boxes, compromising their correct working during the same crash.

Another analogue disadvantage is that in the case of a failure of a support element constrained to said second rear extremity, it determines an intensification of the stresses on said second rear extremity compromising the functionality of the crash box.

This because also in this case the plurality of folding start from said second rear extremity.

SUMMARY OF THE INVENTION

Purpose of the present invention is that to realize a crash box having a better stability during a crash and that reduce at the minimum the possibility of a collapse starting from a rear portion of the same, and at the same time without make worse the absorbing capacity of the energy during the crash.

Another purpose is that to realize a crash box for a vehicle that permit to have a collapsing force most constant as possible during its crushing caused by a crash and that at the same time reduce at the minimum the probability of a collapse starting from a rear portion of the same crash box.

Still another purpose is that to realize a crash box that can be able to absorb also forces angled respect to a frontal portion of the same, reducing at the minimum the probability of a collapse starting from a rear portion of the same crash box.

Still another purpose is that to realize a crash box that can have an improved stability, maintaining the same absorbing capacity of the crash and without have to reduce the length of the same.

Further purpose is that to realize a crash box for a vehicle that can be easy to realize and that can be economically advantageous.

Further features of the invention are pointed out in the following claims.

BRIEF DESCRIPTION OF THE DRAWING FIGURES

The features and the advantages of a crash box according to the present invention will appear more evident from the following illustrative and not limitative description, referred to the attached schematic drawings in which:

FIG. 6 is a raised lateral right side perspective top view of a another preferred form of embodiment of a crash box according to the present invention;

FIG. 7 is a frontal view of the crash box of FIG. 6.

DETAILED DESCRIPTION OF THE INVENTION

Figure 1:
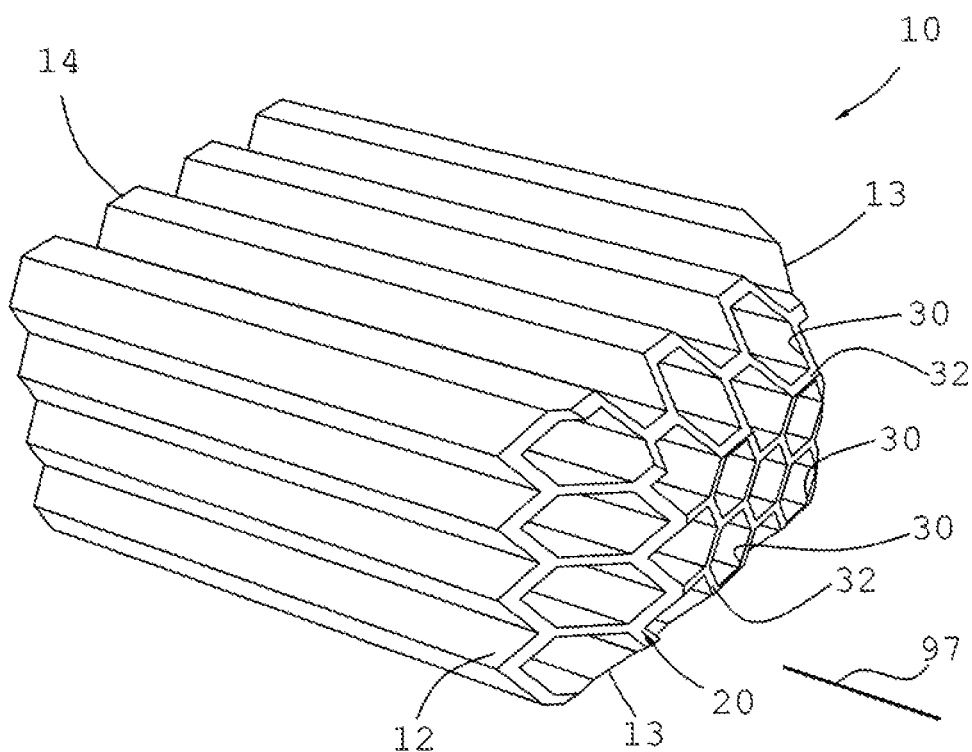
FIG. 1 is a raised lateral left side perspective top view of a preferred form of embodiment of a crash box according to the present invention.
Figure 2:
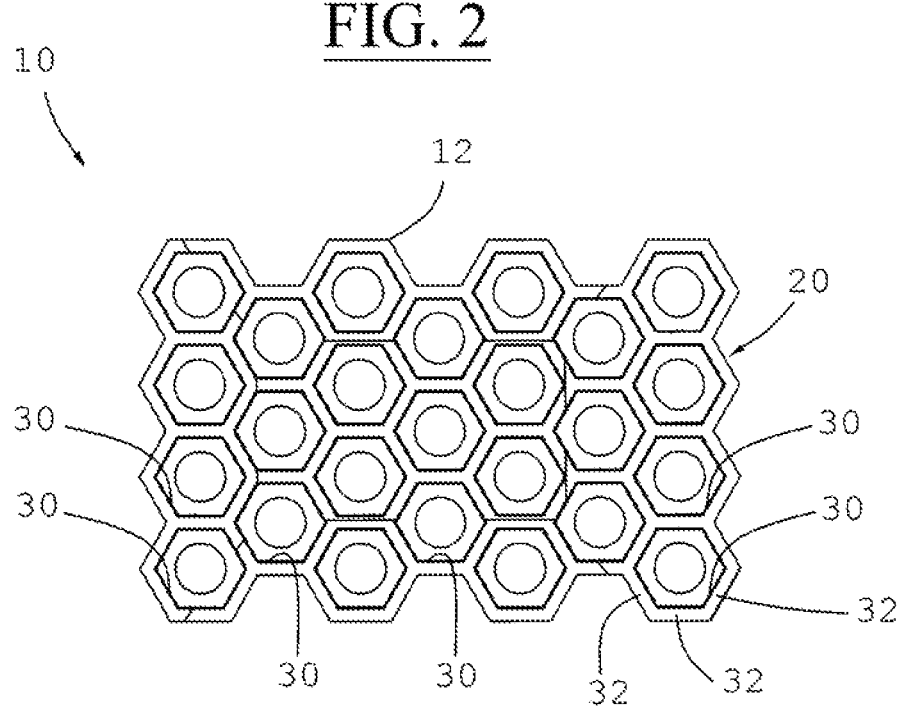
FIG. 2 is a frontal view of the crash box of FIG. 1.
Figure 3:
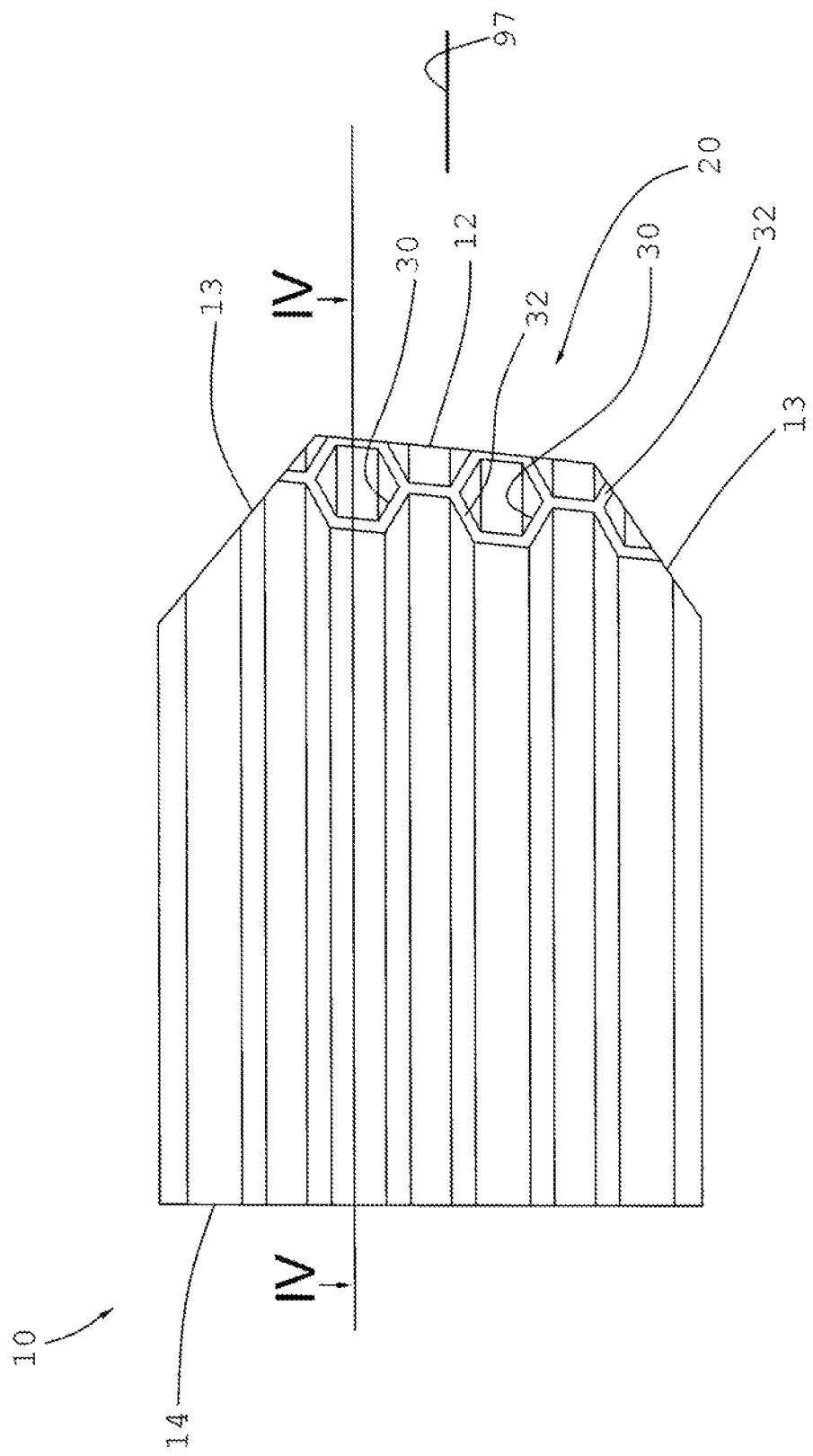
FIG. 3 is a lateral left view of a crash box according to another preferred form of embodiment of the present invention.
Figure 4:
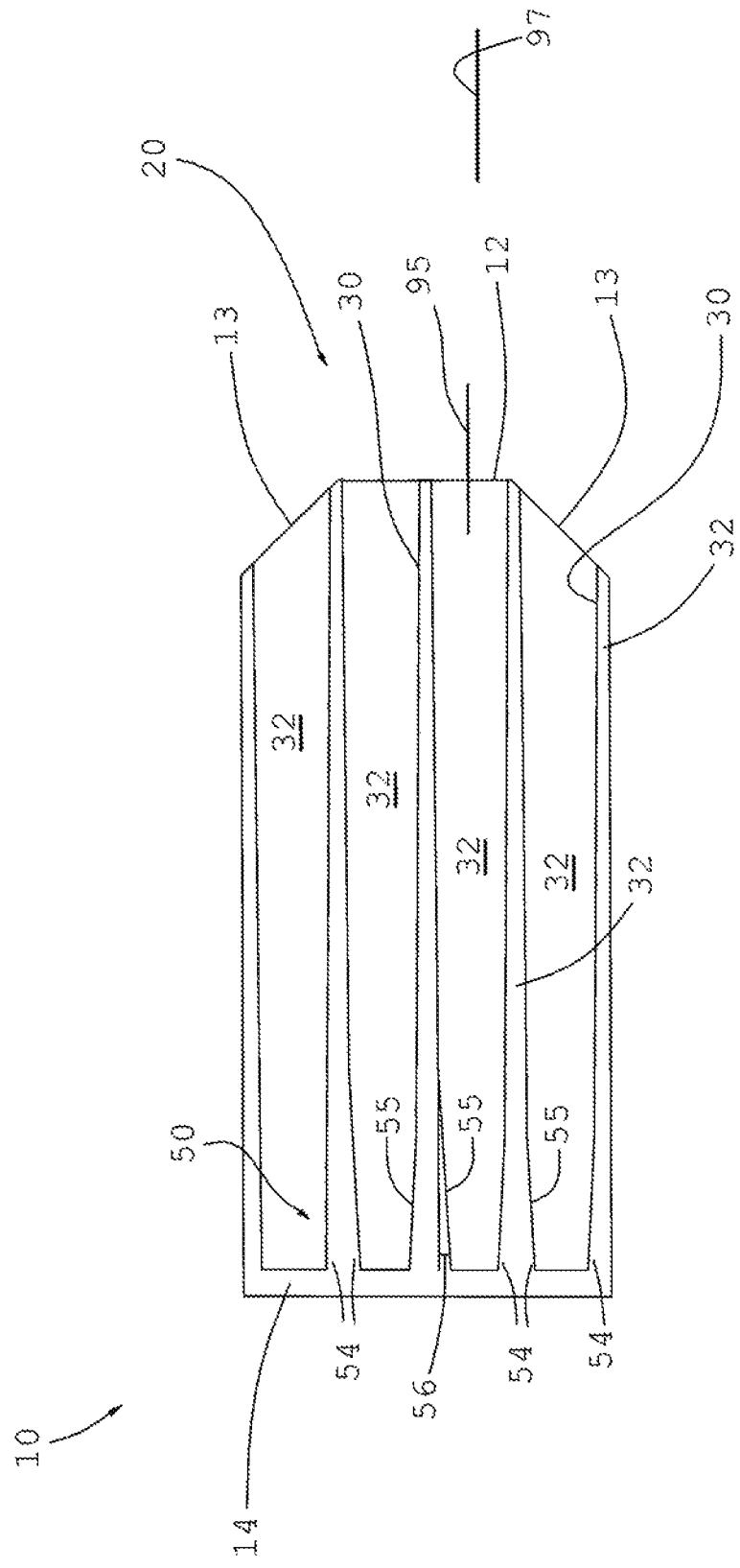
FIG. 4 is a view of a section of the crash box of FIG. 3 sectioned along the line IV-IV.
Figure 5:
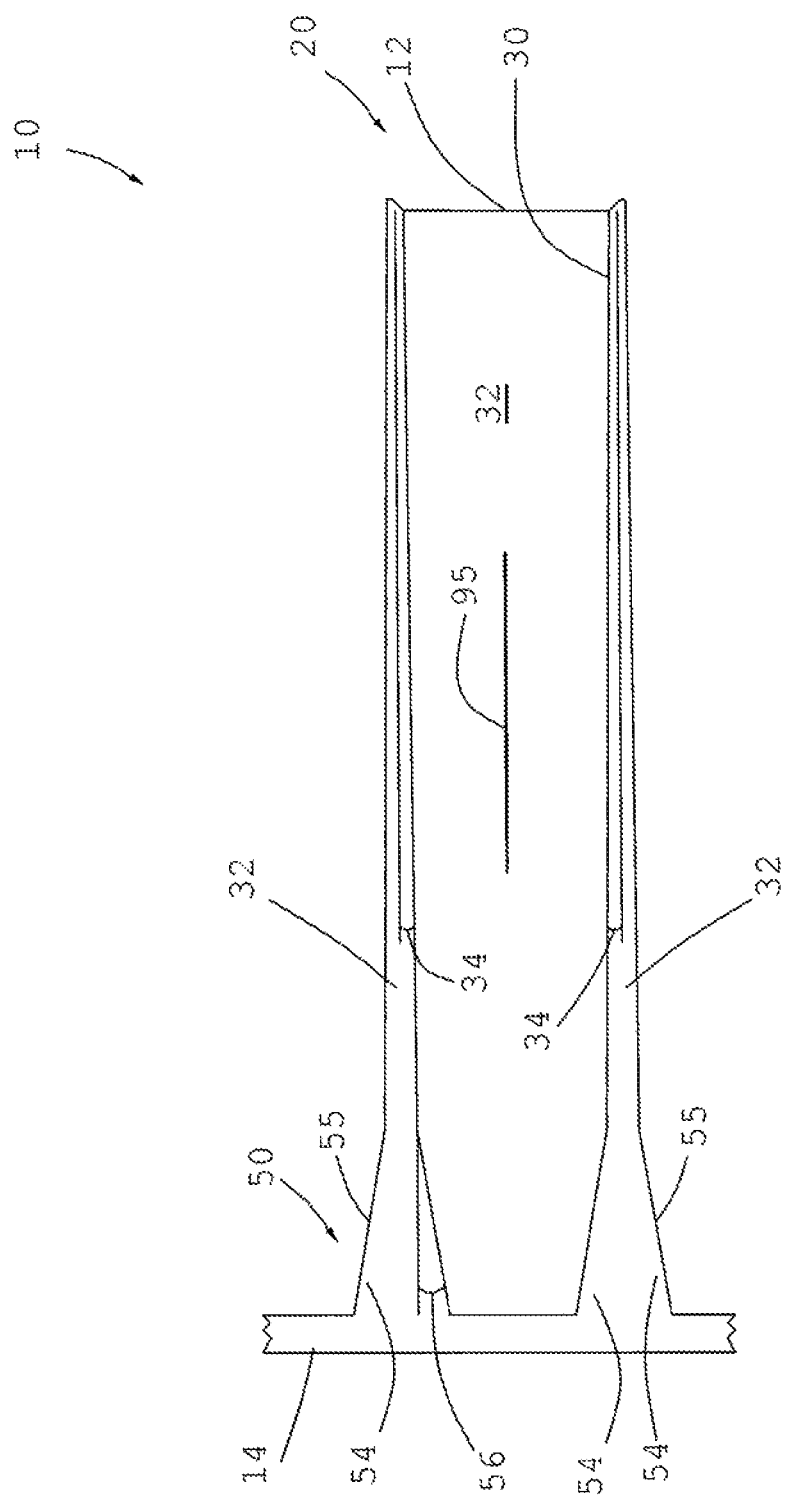
FIG. 5 is a schematic broken view sectioned along a longitudinal axis which shows a particular of a crash box according to a preferred form of embodiment.

With reference to the figure, it is shown a crash box 10 for a motor vehicle, realized in a polymeric material in particular having an high elastic module and having a first open frontal extremity 12 and a second rear extremity 14.

The crash box 10 besides comprises a structure 20 substantially alveolar defined by a plurality of channels 30 realized in just one piece, each of which is preferably provided with a substantially hexagonal section.

Said plurality of channels 30 extends internally to said crash box 10 starting form said first open frontal extremity 12 towards said second rear extremity 14.

According to the present invention said crash box 10 comprises stiffening means 50 of said second rear extremity 14 which are able to stiffen said plurality of channels 30 only in proximity of said second rear extremity 14.

In this way it is advantageously possible to avoid that it determines collapses or folding starting from said second rear extremity 14, without reducing the crash absorbing capacity of the same crash box 10.

Preferably said stiffening means 50 are directly integrated with said second rear extremity 14, in particular internally to the same, and them are realized preferably in a polymeric material having a good impact strength.

In particular said stiffening means 50 do not protrude longitudinally respect to said second rear extremity 14, avoiding therefore to increase the volume and the length of said crash box 10.

Preferably said stiffening means 50 comprise at least a stiffening portion 54 preferably polymeric which is positioned only in proximity of said second rear extremity 14 and besides it is integrated or made integral internally to at least a correspondent channel 30 of said plurality of channels 30.

In this way it is possible to increase the strength of said crash box 10 only in proximity of said second rear extremity 14, maintaining at the same time a weight and encumbrance reduced.

Advantageously this determines besides a greater stability and a greater strength capacity of the crash box 10 without make worse the crash absorbing capacity of the same crash.

According to a preferred form of embodiment said at least a stiffening portion 54 is realized in a polymeric material and it is directly injection moulded in just one piece together with said crash box 10, in such a way to reduce the section of said at least a correspondent channel 30 only in proximity of said second rear extremity 14.

In particular said at least a stiffening portion 54 preferably polymeric shows a profile 55 which results inclined, respect to an axis 95 of said at least a correspondent channel 30, of a second medium rake angle 56 included preferably between 0.1° and 4° and in particular included between 0.5° and 2°.

Advantageously this permit to have a second rear extremity 14 stable and easy to realize, and besides able to reduce progressively the stiffness of each channel 30 going towards said first open frontal extremity 12, in a way to not reduce the crash absorbing capacity of said crash box 10.

Preferably for obtaining a collapsing force the most possible constant during said crash at least a part of said plurality of channels 30 results internally slightly tapered going towards said second rear extremity 14, and besides preferably shows a plurality of walls 32 each of which shows a first minor medium rake angle 34 which respect to an axis 95 of a correspondent channel 30 is preferably included between 0.01° and 1° and in particular included between 0.01° and 0.5°.

Advantageously this permit to further stabilize during the crash said first open frontal extremity 12 without excessively increase his strength to said crash.

In this way it is possible to determine a plurality of programmed folding starting from said first open frontal extremity 12 without to limit the absorbing capacity of said crash box 10.

According to a preferred form of embodiment at least a part of said plurality of channels 30 internally shows a first minor medium rake angle 34 starting from said first open frontal extremity 12, which respect to an axis 95 of a correspondent channel 30 shows a value preferably included between 0.01° and 1° and more preferably included between 0.01° and 0.5°, and a second greater medium rake angle 56 which is present only in proximity of said second rear extremity 14 and besides which respect to said axis 95 shows a value preferably included between 0.01° and 4° and more preferably included between 0.5° and 2°.

Preferably at least a part of said plurality of channels 30 only in proximity of said second rear extremity 14 results tapered in asymmetric way respect to an axis 95.

Advantageously in this way it is possible to realize a polymeric crash box 10 simple to realize and with a reduced production cost.

Preferably at least a part of said plurality of channels 30 results externally tapered going towards said first open frontal extremity 12 and besides shows externally a medium rake angle which respect to an axis 95 of each correspondent channel 30 shows preferably a value included between 0° and 4° and in particular included between 0° and 2°.

Preferably said first open frontal extremity 12 shows a plurality of faces 13 which results inclined and not orthogonal respect to a longitudinal direction 97 permitting advantageously to reduce the initial collapsing force in the first instant of said crash.

Said plurality of faces 13 has the function of reduce the initial stress during said crash in particular in the case of a crash force angled respect to said longitudinal direction 97.

In this way it is also possible to have ever a surface of a face 13 which results substantially orthogonal to said angled crash force, obtaining consequently a better distribution of the stress on a greater number of channels 30 of said plurality of channels 30.

Vice versa without said plurality of faces 13 with an angled crash force would determine a distribution of the stresses on a very reduced number of channels 30 determining consequently a lesser crash absorbing capacity because the number of channels 30 stressed would be inferior.

Preferably said crash box 10 comprises fixing means in particular connectable to a frame of said motor vehicle, which are constrained or directly integrated with said second rear extremity 14.

Preferably said fixing means comprises a plurality of holes which are obtained in said second rear extremity 14 and permit advantageously a reduction of the total weight of said crash box 10.

Preferably said crash box 10 comprises besides a through hole 70 substantially longitudinal, for permitting the insertion of an hook usable in particular for tow a transport means, which in particular results tapered preferably in proximity of said second rear extremity 14 of an angle preferably included between 0.01° and 4° and more preferably included between 0.01° and 2°.

This in a way to avoid a collapse or a plurality of folding starting from said second rear extremity 14.

Preferably said crash box 10 is realized in just one piece, in particular through injection moulding, with a polymeric material with high impact strength, which with a test of the type ISO 180/1A at 23° C. shows a breaking energy of at least 5 KJ/m2 and in particular of at least 10 KJ/m$^2$, which in particular is a polymeric material preferably chosen between polymeric 10 materials known with commercial terms XENOY™ and NORYL™ and/or between polymeric materials having similar characteristics.

According to a further aspect of the present invention it is furnished a bumper structure for a vehicle comprising at least two crash boxes 10 of the type previously described, and besides preferably comprising a metallic or polymeric cross member, not shown in the figures, which extends between said at least two crash boxes 10, and besides comprising a polymeric external bumper covering having only an aesthetic function, also this not shown in the figures, which cover said cross member and said at least two crash boxes 10.

According to a further aspect of the present invention it is furnished a motor vehicle comprising a bumper structure in particular rear of the type previously described.

In this way it has been seen that a crash box according to the present invention achieves the objectives previously mentioned.

The crash box of the present invention thus conceived can undergo to numerous modifications and variations, all included in the same inventive concept.

Furthermore, in practice the materials used, as well as their dimensions and the components, can vary according to the technical needs.

The invention claimed is:

1. A polymeric crash box (10) for a motor vehicle, comprising:
 a first open frontal extremity (12);
 a second rear extremity (14);
 a substantially alveolar structure (20) defined by a plurality of channels (30) realized in one piece, each of which has a substantially hexagonal cross section, said plurality of channels (30) extending internally to said crash box (10)

starting from said first open frontal extremity (12) towards said second rear extremity (14); and stiffening means (50) of said second rear extremity (14) configured to stiffen said plurality of channels (30) only in proximity of said second rear extremity (14), the stiffening means being made from polymeric material and being formed from at least one inclined stiffening portion directly integrated with said second rear extremity (14), wherein at least a part of said plurality of channels (30) tapers internally going towards said second rear extremity (14).

2. The crash box (10) according to claim 1, stiffening means (50) comprises the at least one stiffening portion (54) is positioned only in proximity of said second rear extremity (14) and the stiffening means is integrated or made integral internally to at least a correspondent channel (30) of said plurality of channels (30).

3. The crash box (10) according to claim 2, wherein said at least one stiffening portion (54) shows a profile (55) which is inclined, with respect to an axis (95) of said at least one correspondent channel (30), of a second medium rake angle (56) between 0.1 and 4°.

4. The crash box (10) according to claim 1, wherein at least a part of said plurality of channels (30) shows a plurality of walls (32) each of which shows a first minor medium rake angle (34) with respect to an axis (95) of a correspondent channel (30) is between 0.01° and 1°.

5. The crash box (10) according to claim 1, wherein at least a part of said plurality of channels (30) internally shows a first minor medium rake angle (34) starting from said first open frontal extremity (12), with respect to an axis (95) of a correspondent channel (30) shows a value between 0.01° and 1°, and a second greater medium rake angle (56) which is present only in proximity of said second rear extremity (14) and with respect to said axis (95) shows a value between 0.01° and 4°.

6. The crash box (10) according to claim 1, wherein at least a part of said plurality of channels (30) only in proximity of said second rear extremity (14) tapers in an asymmetric way with respect to an axis (95).

7. The crash box (10) according to claim 1, wherein at least a part of said plurality of channels (30) externally tapers going towards said first open frontal extremity (12) and shows externally a medium rake angle with respect to an axis (95) of each correspondent channel (30) at a value included between 0° and 4°.

8. The crash box (10) according to claim 1, wherein said first open frontal extremity (12) shows a plurality of faces (13) which incline and are not orthogonal with respect to a longitudinal direction (97).

9. The crash box (10) according to claim 1, further comprising means for fixing connectable to a frame of said motor vehicle which are constrained or directly integrated with said second rear extremity (14).

10. The crash box (10) according to claim 1, further comprising a through hole (70) substantially longitudinal which results in a taper in proximity of said second rear extremity (14) at an angle between 0.01° and 4°.

11. The crash box (10) according to claim 1, wherein the crash box is formed one piece with a polymeric material with high impact strength, which with a test of the type ISO 180/1A at 23° C. shows a breaking energy of at least 5 KJ/m².

12. A bumper structure for a vehicle comprising:
at least two crash boxes (10) according to claim 1;
a metallic or polymeric cross member which extends between said at least two crash boxes (10); and
a polymeric external bumper covering having only an aesthetic function which cover said cross member and said at least two crash boxes (10).

13. A motor vehicle comprising a rear bumper structure according to claim 12.

14. The crash box (10) according to claim 2, wherein said at least one stiffening portion (54) is polymeric and shows a profile (55) which is inclined, with respect to an axis (95) of said at least one correspondent channel (30), of a second medium rake angle (56) between 0.5 and 2°.

15. The crash box (10) according to claim 1, wherein at least a part of said plurality of channels (30) shows a plurality of walls (32) each of which shows a first minor medium rake angle (34) with respect to an axis (95) of a correspondent channel (30) is between 0.01° and 0.5°.

16. The crash box (10) according to claim 1, wherein at least a part of said plurality of channels (30) internally shows a first minor medium rake angle (34) starting from said first open frontal extremity (12), with respect to an axis (95) of a correspondent channel (30) shows a value between 0.01° and 0.5°, and a second greater medium rake angle (56) which is present only in proximity of said second rear extremity (14) and with respect to said axis (95) shows a value between 0.5° and 2°.

17. The crash box (10) according to claim 1, wherein at least a part of said plurality of channels (30) externally tapers going towards said first open frontal extremity (12) and shows externally a medium rake angle with respect to an axis (95) of each correspondent channel (30) at a value included between 0° and 2°.

18. A one-piece polymeric crash box for a motor vehicle, comprising:
a first open frontal extremity;
a second rear extremity;
a substantially longitudinal through hole;
a substantially alveolar structure defined by a plurality of channels realized in one piece around the through hole, each of which has a substantially hexagonal cross section, said plurality of channels extending internally to said crash box starting from said first open frontal extremity towards said second rear extremity; and
a stiffener of said second rear extremity which is configured to stiffen said plurality of channels only in proximity of said second rear extremity, the stiffener being made from polymeric material and being formed from at least one inclined stiffening portion directly integrated with said second rear extremity, such that
at least a part of said plurality of channels tapers internally going towards said second rear extremity.

19. The crash box according to claim 18, wherein at least a part of said plurality of channels internally show a first minor medium rake angle starting from said first open frontal extremity, with respect to an axis of a correspondent channel shows a value between 0.01° and 1°, and a second greater medium rake angle which is present only in proximity of said second rear extremity and with respect to said axis shows a value between 0.01° and 4°.

* * * * *